(12) United States Patent
Lu et al.

(10) Patent No.: US 10,539,435 B2
(45) Date of Patent: Jan. 21, 2020

(54) PRESSURE COMPENSATED SENSORS

(71) Applicant: General Electric Company, Schenectady, NY (US)

(72) Inventors: Dan Tho Lu, Minden, NV (US); Lam Arthur Campbell, Houston, TX (US); David O'Connor, Gardnerville, NY (US); Bryan Shadel, Minden, NY (US)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 15/598,161

(22) Filed: May 17, 2017

(65) Prior Publication Data

US 2018/0335324 A1 Nov. 22, 2018

(51) Int. Cl.
*E21B 47/01* (2012.01)
*E21B 47/017* (2012.01)
*E21B 47/09* (2012.01)
*G01D 11/24* (2006.01)
*G01D 11/26* (2006.01)
(Continued)

(52) U.S. Cl.
CPC ........ *G01D 11/245* (2013.01); *E21B 33/0385* (2013.01); *E21B 47/011* (2013.01); *E21B 47/09* (2013.01); *G01D 11/26* (2013.01); *G01D 11/30* (2013.01)

(58) Field of Classification Search
CPC combination set(s) only.
See application file for complete search history.

(56) References Cited

U.S. PATENT DOCUMENTS 3,385,369 A 5/1968 Saurenman
5,644,186 A 7/1997 Birchak et al.
(Continued)

FOREIGN PATENT DOCUMENTS

EP 2940246 A1 11/2015
EP 3 073 497 A1 9/2016
EP 3091175 A1 11/2016

OTHER PUBLICATIONS

Extended European Search Report and Opinion issued in connection with corresponding EP Application No. 18172200.0 dated Sep. 17, 2018.
(Continued)

*Primary Examiner* — Nguyen Q. Ha
(74) *Attorney, Agent, or Firm* — Mintz Levin Cohn Ferris Glovsky and Popeo, P.C.

(57) ABSTRACT

A pressure compensated sensing system and methods for using the same are provided. The system can include a housing, a seal, an incompressible fluid, and sensing elements. The seal can be positioned within a housing cavity and divide the cavity into two portions. A first cavity portion can be sealed from the fluid environment by the seal and contain the sensing elements and the incompressible fluid. A second cavity portion can be in fluid communication with the fluid environment. The fluid environment can apply an external pressure to the seal that is opposed by an internal pressure of the sealed cavity applied to the seal by the incompressible fluid. When the internal pressure and the external pressure are different, the seal can move in a manner that changes the volume of the sealed cavity by an amount sufficient to equalize the internal pressure with the external pressure.

8 Claims, 6 Drawing Sheets

(51) Int. Cl.
  *G01D 11/30* (2006.01)
  *G01V 13/00* (2006.01)
  *E21B 33/038* (2006.01)

(56) References Cited

U.S. PATENT DOCUMENTS

| | | | |
|---|---|---|---|
| 6,439,055 B1 | 8/2002 | Maron et al. | |
| 6,483,778 B1 | 11/2002 | Pozzo et al. | |
| 9,016,387 B2 * | 4/2015 | Williamson, Jr. | E21B 33/10 166/386 |
| 9,200,496 B2 * | 12/2015 | Reid | E21B 33/0355 |
| 9,658,362 B2 * | 5/2017 | Hernandez Marti | E21B 47/011 |
| 2007/0284117 A1 * | 12/2007 | Smithson | E21B 17/023 166/385 |
| 2010/0051260 A1 * | 3/2010 | Vick, Jr. | E21B 47/011 166/151 |
| 2010/0147064 A1 * | 6/2010 | DiFoggio | E21B 47/011 73/152.18 |
| 2011/0101967 A1 | 5/2011 | Kayserman et al. | |
| 2013/0167962 A1 | 7/2013 | Skjetne et al. | |
| 2015/0300841 A1 | 10/2015 | Campbell et al. | |
| 2015/0300848 A1 | 10/2015 | Campbell et al. | |
| 2016/0123830 A1 | 5/2016 | Brown et al. | |
| 2016/0138948 A1 | 5/2016 | Cordill | |
| 2017/0085071 A1 | 3/2017 | Burrow et al. | |
| 2018/0017416 A1 * | 1/2018 | Haldorsen | G01D 11/245 |

OTHER PUBLICATIONS

Extended European Search Report and Opinion issued in connection with corresponding EP Application No. 18172199.4 dated Sep. 4, 2018.

* cited by examiner

PRESSURE COMPENSATED SENSORS

BACKGROUND

Machinery is often deployed in subsea environments for applications such as energy production (e.g., oil and gas). Subsea environments can present complex and unpredictable conditions that can result in machine damage requiring maintenance. Since subsea maintenance generally requires planning and specialized equipment, sensors are commonly installed to evaluate the health of subsea machinery, allowing early warning and preparation to be performed prior to loss of production.

Like subsea machinery, these sensors are designed to withstand in service pressures (e.g., due to the subsea environment, the machinery, etc.). As an example, sensors can include thick walled housings capable of withstanding anticipated subsea pressures. However, such sensor configurations can increase the cost and weight of the sensor.

SUMMARY

In general, systems and methods are provided for pressure compensation of sensors such as proximity sensors.

In one embodiment, a pressure compensated sensor system is provided and can include a housing, a seal, and one or more sensing elements. The housing can define a cavity therein, and the seal can be positioned within the cavity and it can divide the cavity into a first fluidly sealed cavity portion and a second cavity portion exposed to a fluid environment surrounding the housing. The one or more sensing elements can be positioned within the first cavity portion. An incompressible fluid can be disposed within the first cavity portion. The seal can include at least two chambers, each chamber having a volume that is configured to change in response to pressure differences between the first cavity portion and the second cavity portion.

In one embodiment, the housing can include at least one aperture in a sidewall configured to allow fluid to flow from the fluid environment into the second cavity portion.

The seal can have a variety of configurations. In one aspect, the seal can include a collar interposed between a first chamber and a second chamber, where opposing ends of the first and second chambers are coupled to the collar. The collar can be configured to axially translate along a longitudinal axis of the housing for to change the volume in each of the first and second chambers.

In another embodiment, the incompressible fluid substantially fills the first cavity portion. The one or more sensing elements can also be submerged within the incompressible fluid. The incompressible fluid can be, for example, a dielectric.

In other aspects, a pressure compensated proximity sensing system is provided and can include a housing, a cap, an inner tube, and a seal. The housing can define a cavity extending along its length. The cap can be secured to a distal end of the housing and define a cap volume configured to receive at least one proximity sensing element. The seal can be positioned within the cavity and it can extend at least a portion of a length of the housing. The seal can also have at least two chambers having different diameters. The seal and the cap volume can define a first cavity portion that is hermetically sealed and that contains an incompressible fluid therein. The seal and the housing can define a second cavity portion that is configured to receive a flow of fluid from a fluid environment surrounding the housing. The seal can be configured to adjust a pressure within the first cavity portion in response to a pressure difference between the first cavity portion and the second cavity portion.

In certain aspects, the housing can include at least one aperture for allowing an environmental fluid to flow into the second cavity portion.

The seal can have a variety of configurations. In one aspect, the first chamber can have a diameter greater than the second chamber and it can be positioned distally thereto. The seal can be configured to translate distally along a longitudinal axis of the housing to increase a pressure within the first cavity portion. The first chamber can include a first bellows and the second chamber can include a second bellows.

In another embodiment, an inner tube can be positioned within the first cavity portion. The first and second chambers can be coupled to one another at opposing longitudinal ends of a collar disposed around the seal and slidingly coupled to the inner tube.

In another embodiment, the sensing system can include at least one proximity sensing element disposed within the cap, and an electrical connector coupled to a proximal end of the housing and having a plurality of wires extending through the inner tube and in electrical communication with the at least one proximity sensing element.

In another embodiment, the incompressible fluid can substantially fill the first cavity portion. The incompressible fluid can be, for example, a dielectric.

Methods for equalizing pressure for a sensor within a fluid environment are also provided. In one embodiment, a method can include positioning a sensor within a fluid environment, the sensor having a first cavity containing an incompressible fluid and at least one sensing element, the incompressible fluid applying an internal pressure against a first side of a seal including at least two chambers of different diameter. An environmental fluid surrounding the sensor can flow into and can apply an external pressure on a second side of the seal, opposite to the first side of the seal. The seal can move from a first position to a second position to vary a volume of the at least two chambers in response to a pressure difference between the first and second cavities.

In one embodiment, the pressure difference decreases when the seal is moved from the first position to the second position.

In other aspects, the seal can stop moving when the pressure difference is about zero.

In another embodiment, the seal can move from the first to the second position by axial translation along a longitudinal axis of the sensor for varying a volume of each of the at least two chambers.

In another embodiment, substantially all void space within the first cavity can be filled with the incompressible fluid.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Subsea sensing systems, such as proximity sensing systems, are often used to measure health of machinery in subsea environments. As an example, a proximity sensing system can include a sensing element that detects movement of a target machinery component without contact by generating a magnetic field that induces an eddy current in the target and acquiring return voltage signals that are proportional to a change in distance between the sensing element and the target. Analysis of return signals can provide a measurement of machine health by identifying whether motion of the target machinery component (e.g., distance, displacement, vibration, speed, etc.) is within normal tolerances. In order to operate in subsea environments, subsea sensing systems typically include a housing that protects the sensing element from contact with a subsea environment and from pressure exerted by the subsea environment. However, because the pressure at which the housing is sealed is less than the subsea environment pressure, this housing can be relatively thick to withstand the higher subsea environment pressure. However, the extra housing material can interfere with acquiring return signals. Accordingly, subsea sensors are provided that can seal sensing elements from the subsea environment while also matching the pressure surrounding the sensing elements with the subsea environmental pressure, avoiding the need to thicken the housing to withstand subsea pressures. Other embodiments are within the scope of the disclosed subject matter.

Embodiments of sensing systems are discussed herein with reference to pressure compensated sensors suitable for use in subsea environments. However, embodiments of the disclosure can be employed with any environment without limit.

Figure 1:
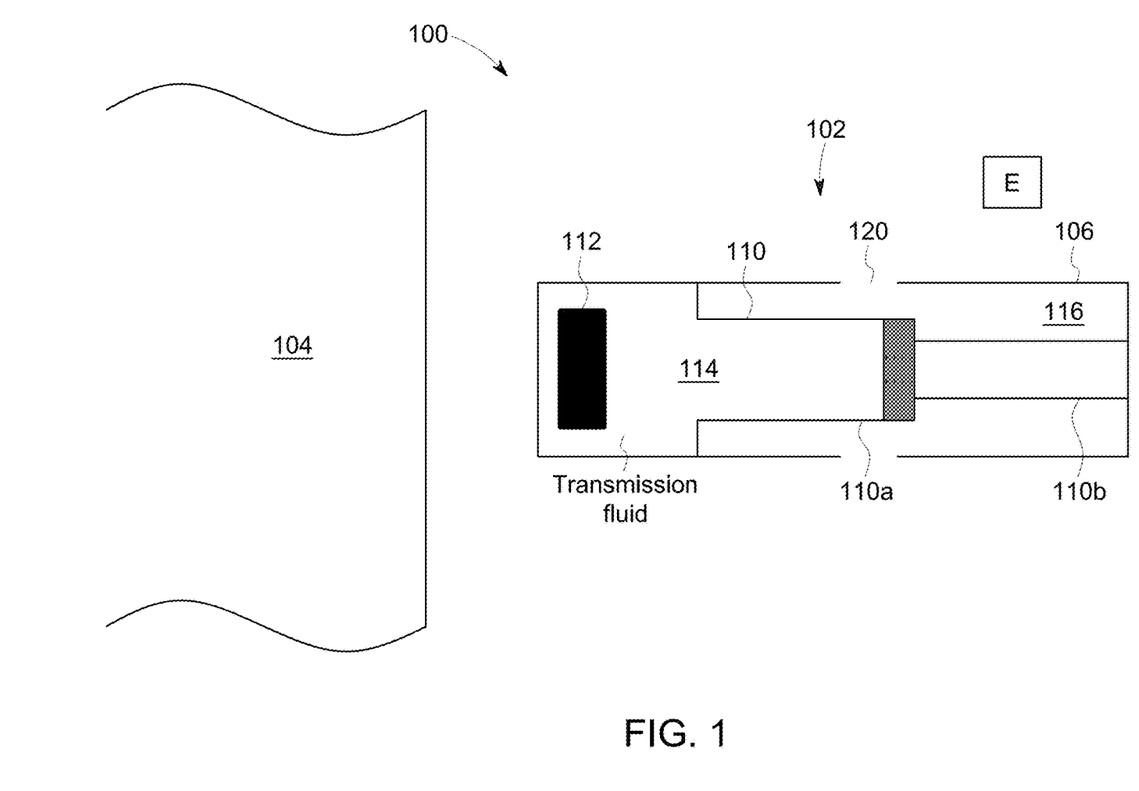
FIG. 1 is a diagram illustrating one exemplary embodiment of an operating environment including a pressure compensated sensor having a housing and a moveable seal positioned within the housing.

FIG. 1 illustrates one exemplary embodiment of an operating environment 100 containing a pressure compensated sensing system 102 and a target 104. In certain aspects, the operating environment 100 can be fluid environment E, such as a subsea environment. As discussed in detail below, the pressure compensated sensing system 102 can include a housing 106, such as a tubular housing, a seal 110, an incompressible fluid I, and at least one sensing element 112. The seal 110 can be positioned within the housing 106 such that it divides housing into two cavity portions. A first cavity portion, also referred to as a sealed cavity 114, can be sealed from the fluid environment E by the seal 110 and it can contain the at least one sensing element 112 and the incompressible fluid I. A second cavity portion, also referred to as an open cavity 116, can be in fluid communication with the fluid environment E (e.g., via an aperture 120 formed through a lateral sidewall of the housing 106). The fluid environment E can apply an external pressure $P_E$ to the seal 110 that is opposed by an internal pressure $P_I$ applied to the seal 110 within the sealed cavity 114 by the incompressible fluid I. The seal 110 can be in the form of two or more chambers (e.g., 110a, 110b) axially coupled together and in fluid communication. When the internal pressure $P_I$ and the external pressure $P_E$ are different, the chambers 110a, 110b can be configured to move in a manner that changes the volume of the sealed cavity 114 by an amount sufficient to equalize the internal pressure $P_I$ with the external pressure $P_E$. Because the internal pressure $P_I$ can change to match the external pressure $P_E$, the housing 106 does not need to be designed to withstand the external pressure $P_E$.

Figure 2:
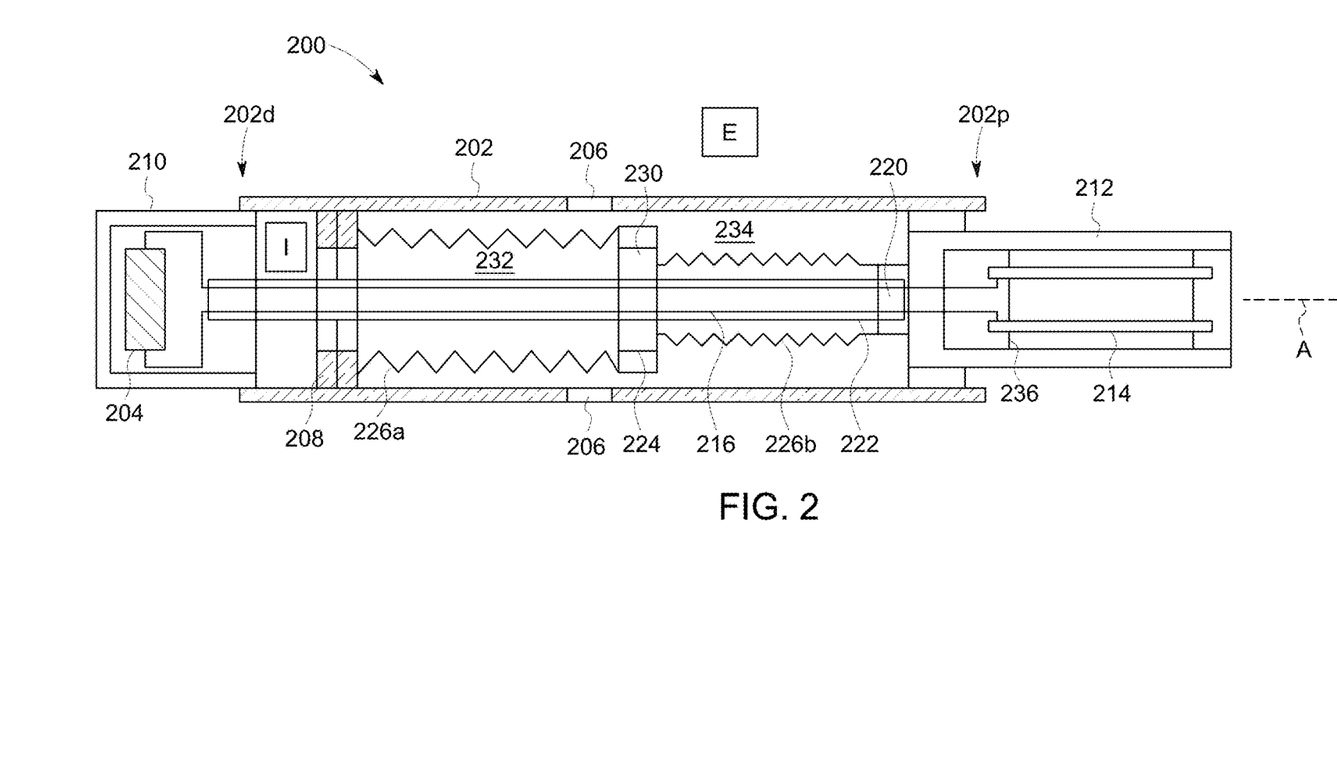
FIG. 2 is a cross-sectional view of one exemplary embodiment of a pressure compensated sensor of FIG. 1 in the form of a proximity sensor including a chambered seal including two bellows of different diameter.

FIG. 2 illustrates one exemplary embodiment of a pressure compensated sensing system in the form of a proximity sensor 200 that can be used in the operating environment 100 of FIG. 1. As shown, the proximity sensor 200 includes a housing 202 having one or more proximity sensing elements 204 disposed therein. The housing 202 can have a length extending along a longitudinal axis A between a distal end 202d and a proximal end 202p. The housing 202 can also include one or more apertures 206 for fluid communication with the fluid environment E, and an inward extending inner wall 208 for attachment to a chambered seal, as discussed below.

The housing 202 can have various shapes and sizes. For example, the housing 202 can be in the form of a generally hollow tube or cylinder (e.g., a right cylinder). The housing 202 can also be formed by any process and materials suitable for use within the fluid environment E. As an example, the housing 202 can be formed from polymers, ceramics, metals, and metal alloys (e.g., steels, copper and copper alloys, aluminum and aluminum alloys, etc.).

The proximal end 202p and distal end 202d of the housing 202 can be configured to couple to one or more fluid-tight internal couplings (not shown). For example, a cap 210 can couple to and form a fluid-tight seal with the distal end 202d of the housing 202, and an electrical connector 212 can couple to and form a fluid-tight seal with the proximal end 202p of the housing 202. The fluid-tight couplings can be formed using, for example, threaded engagements, clamps, welds, brazes, and the like.

As shown in FIG. 2, the cap 210 can have tubular shape with a volume sufficient to receive at least a portion of the proximity sensing elements 204 therein. As an example, the cap 210 can be formed as a right cylinder having a closed distal facing surface and an open proximal facing surface approximately co-axial with the housing 202.

As discussed above, the proximity sensing elements 204 can be positioned within the cap 210. In general, the proximity sensing elements 204 can be configured to acquire one or more proximity measurements of a target (e.g., target 104 in FIG. 1). Examples of proximity measurements can include, but are not limited to, one or more of distance, displacement, vibration, and speed of the target. In certain aspects, the target can be an electrically conductive (e.g., metallic) machine component and the proximity sensing elements 204 can be eddy current (EC) sensing elements. The proximity sensing elements 204 can include a wire coil (not shown) configured to receive an alternating current and thereby generate a magnetic field. When this generated magnetic field impinges the conductive target, small currents (i.e., eddy currents) can be induced within the target. These induced eddy currents can in turn produce induced magnetic fields that oppose the magnetic field generated by the proximity sensing elements 204. The interaction between the magnetic field generated by the proximity sensing elements 204 and the opposing magnetic fields induced by the target's eddy currents is dependent upon a distance between the proximity sensing elements 204 and the target. As this distance changes, electronics (not shown) can detect a change in impedance of the proximity sensing elements 204 and output a return signal (e.g., voltage) proportional to the change in distance. The return signal can be subsequently analyzed to determine the acquired proximity measurement(s).

To facilitate acquisition of proximity measurements of the target, the cap 210 can be formed from a non-magnetic material to avoid perturbing magnetic fields generated by the proximity sensing elements 204. Examples of suitable non-magnetic materials can include, but are not limited to, ceramics, plastics, and non-magnetic metals and alloys (e.g., non-magnetic steels, non-magnetic cast irons, non-ferrous metals, copper alloys, aluminum alloys, etc.).

The proximity sensing elements 204 can receive power and output return signals via the electrical connector 212. As shown in FIG. 2, the electrical connector 212 can have a tubular shape coupled to the proximal end 202p of the housing 202. In certain embodiments, the electrical connector 212 can be in the form of a right cylinder, positioned approximately co-axial to the housing 202 and having an open proximal facing proximal surface. The electrical connector 212 can be formed from any materials suitable for operation within the fluid environment E, such as those discussed above with respect to the housing 202.

The electrical connector 212 can also include electrically conductive pins 214 mounted therein. The pins 214 can be in electrical communication with the proximity sensing elements 204 via wires 216 extending from the proximity sensing elements 204, along at least a portion of the length of the housing 202, and through an opening 220 in the distal facing surface of the electrical connector 212. The open proximal end of the electrical connector 212 can also be dimensioned to receive a mating electrical cable (not shown) for establishing electrical communication with the pins 214. In this manner, the cable can supply alternating current to the proximity sensing elements 204 and can receive return signals from the proximity sensing elements 204.

The wires 216 can also extend through an inner tube 222 positioned within the housing 202. As shown in FIG. 2, the inner tube 222 can be a tubular structure extending between the distal end of the electrical connector 212 and the cap 210. A proximal end of the inner tube 222 can be coupled to the distal end of the electrical connector 212, about the opening 220, for receipt of the wires 216 therein. The distal end of the inner tube 222 can terminate within the cap 210, adjacent to the proximity sensing elements 204.

A chambered seal 224 is also illustrated in FIG. 2. The chambered seal 224 can be positioned within the housing 202 and it can separate the housing 202 into two portions, as discussed in detail below. As shown, the chambered seal 224 can include at least two axially coupled chambers 226a, 226b that are in fluid communication with one another. A first chamber 226a can be positioned distal to the second chamber 226b and it can have a greater diameter than the second chamber 226b. The chambered seal 224 can be positioned radially about the inner tube 222, between the housing 202 and the inner tube 222, and it can extend along at least a portion of the length of the housing 202. A distal end of the chambered seal 224 (e.g., a distal facing end of a first chamber 226a) can be coupled to the inner wall 208 and a proximal end of the chambered seal 224 (e.g., a proximal facing end of a second chamber 226b) can be coupled to the electrical connector 212. In an alternative embodiment (not shown), the proximal end of the chambered seal can be coupled to the proximal end of the housing.

The first chamber 226a and the second chamber 226b can be coupled together at respective opposing ends by a collar 230. As shown in FIG. 2, the collar 230 can be positioned radially around the inner tube 222 and it can configured to axially slide on or adjacent to an outer surface of the inner tube 222. In an alternative embodiment (not shown), the collar can be omitted and respective opposing ends of the first and second chambers can be directly coupled to one another.

As also shown in FIG. 2, the chambered seal 224 can separate the housing 202 into two portions to define a sealed cavity 232 and an open cavity 234. The sealed cavity 232 can enclose a first volume bounded by the cap 210, an inner surface of the chambered seal 224, and the electrical connector 212. The sealed cavity 232 can also include a second volume bounded by an inner surface of the inner tube 222. The open cavity 234 can include a third volume bounded by an outer surface of the chambered seal 224, the housing 202, the electrical connector 212 and/or the proximal end 202p of the housing 202. The chambered seal 224 can form a fluid-tight coupling with each of the housing 202 (e.g., the inner wall 208), the collar 230, and the electrical connector 212 to hermetically seal the sealed cavity 232 from the open cavity 234. Examples of fluid-tight couplings can include, but are not limited to, threaded engagements, clamps, welds, brazes, and the like.

The configuration of the chambers 226a, 226b can vary. As shown, the chambered seal 224 can include first and second chambers 226a, 226b each having a bellows-like shape and approximately equal length. However, in alternative embodiments, the chambers can adopt other configurations, such as longitudinally straight sides, longitudinally curved sides, and the like, alone or in combination with the illustrated bellows configuration. The relative position and shape (e.g., cross-sectional area, diameter, length, etc.) of each the first and second chambers can also vary.

As discussed in greater detail below, the chambered seal 224 can be configured to elastically deform or flex in response to an applied pressure. The chambered seal 224 can be formed from one or more materials capable of undergoing elastic deformation (e.g., reversible deformation) under anticipated service pressures. Suitable materials can include, but are not limited to, metals and metal alloys (e.g., steel, brass, aluminum, titanium) and polymers (e.g., polyethylene, polytetrafluoroethylene (PTFE), polyetheretherketone (PEEK)).

An incompressible fluid I can be provided within the sealed cavity 232 along with the proximity sensing elements 204. In one aspect, the incompressible fluid I can substantially fill an entire free volume of the sealed cavity 232. That is, the proximity sensing elements 204 can be completely immersed within the incompressible fluid I and the sealed cavity 232 can be substantially free of any voids. In another aspect, the incompressible fluid I can be a dielectric fluid. Examples of the incompressible fluid I can include, but are not limited to, gels, silicone oil, mineral oil, monoethylene glycol, and the like.

In certain embodiments, the sealed cavity 232 can include a distal portion of the electrical connector 212 including the wires 216. Accordingly, the electrical connector 212 can also include a fluid-tight connector seal 236 for further containment of the incompressible fluid I. As a result, the electrical components of the proximity sensor 200 (e.g., proximity sensing elements 204, wires 216, etc.) are immersed within in the dielectric incompressible fluid I. This configuration can protect electrical connections within the proximity sensor 200 and stabilize electrical parameters of the proximity sensing elements 204 (e.g., resistor-inductor-capacitor or RLC circuits), promoting long-term reliability and accuracy of the proximity sensor 200.

Figure 3A:
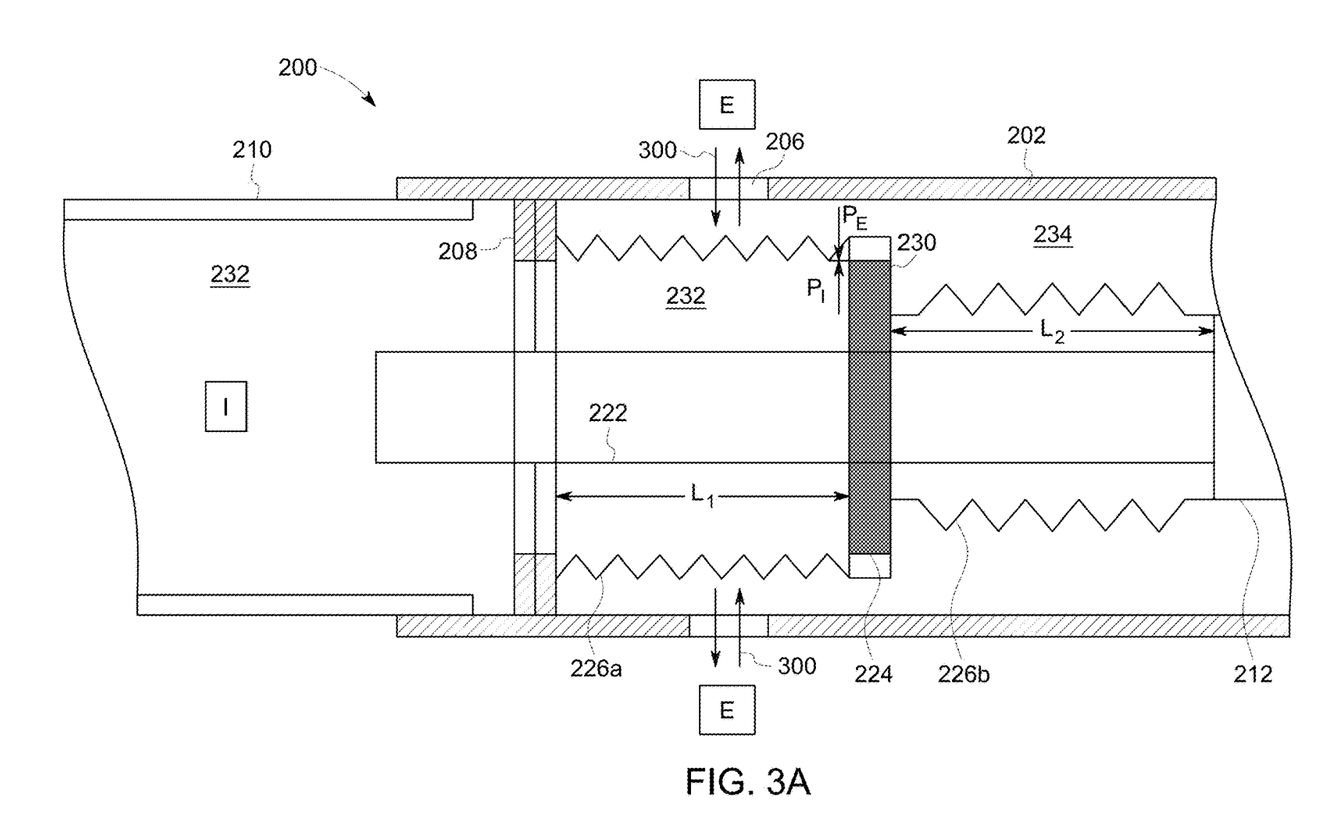
FIG. 3A is an enlarged side view illustrating the chambered seals of FIG. 2 in a neutral position.
Figure 3B:
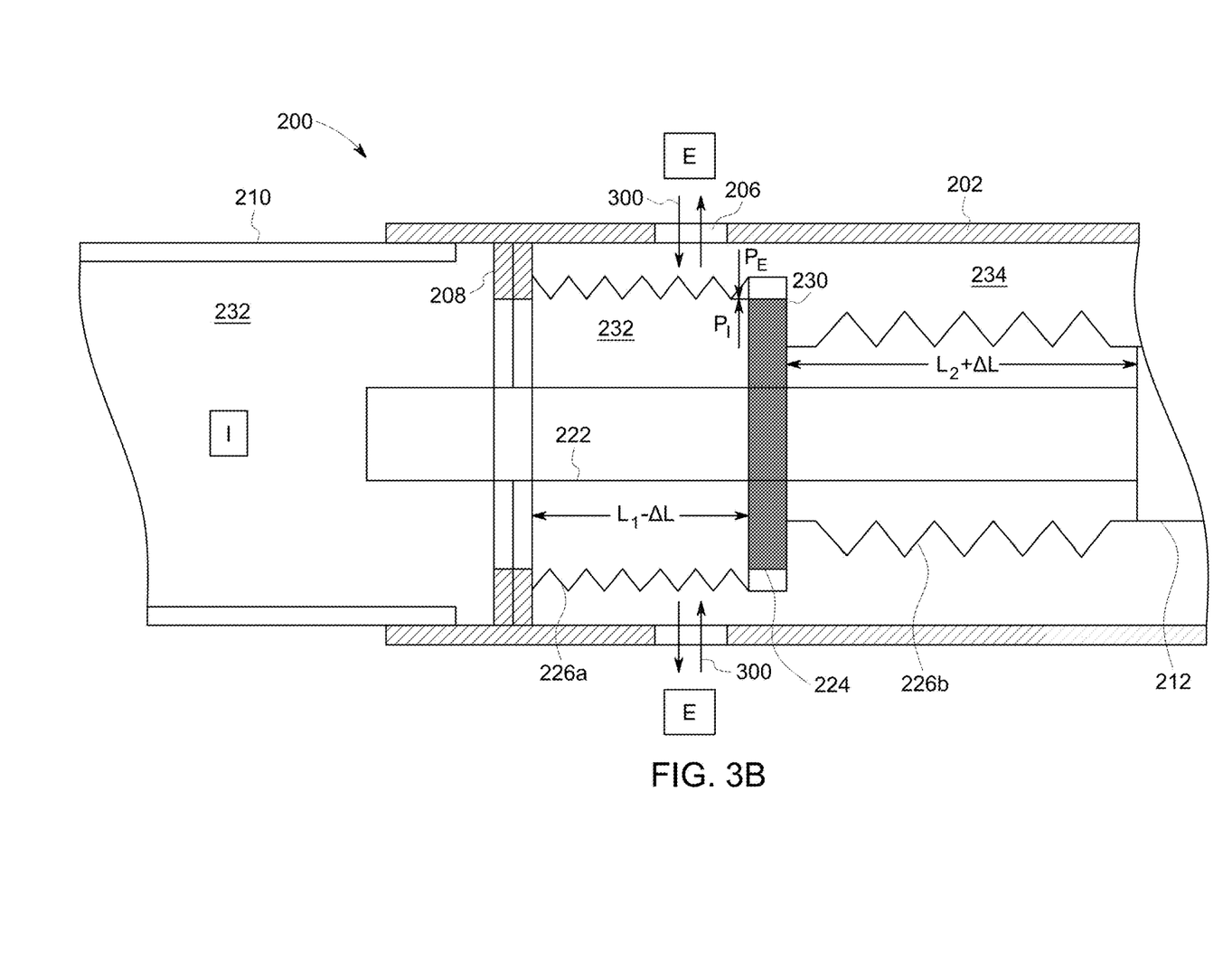
FIG. 3B is an enlarged side view illustrating the chambered seals of FIG. 2 in a first deflected position.
Figure 3C:
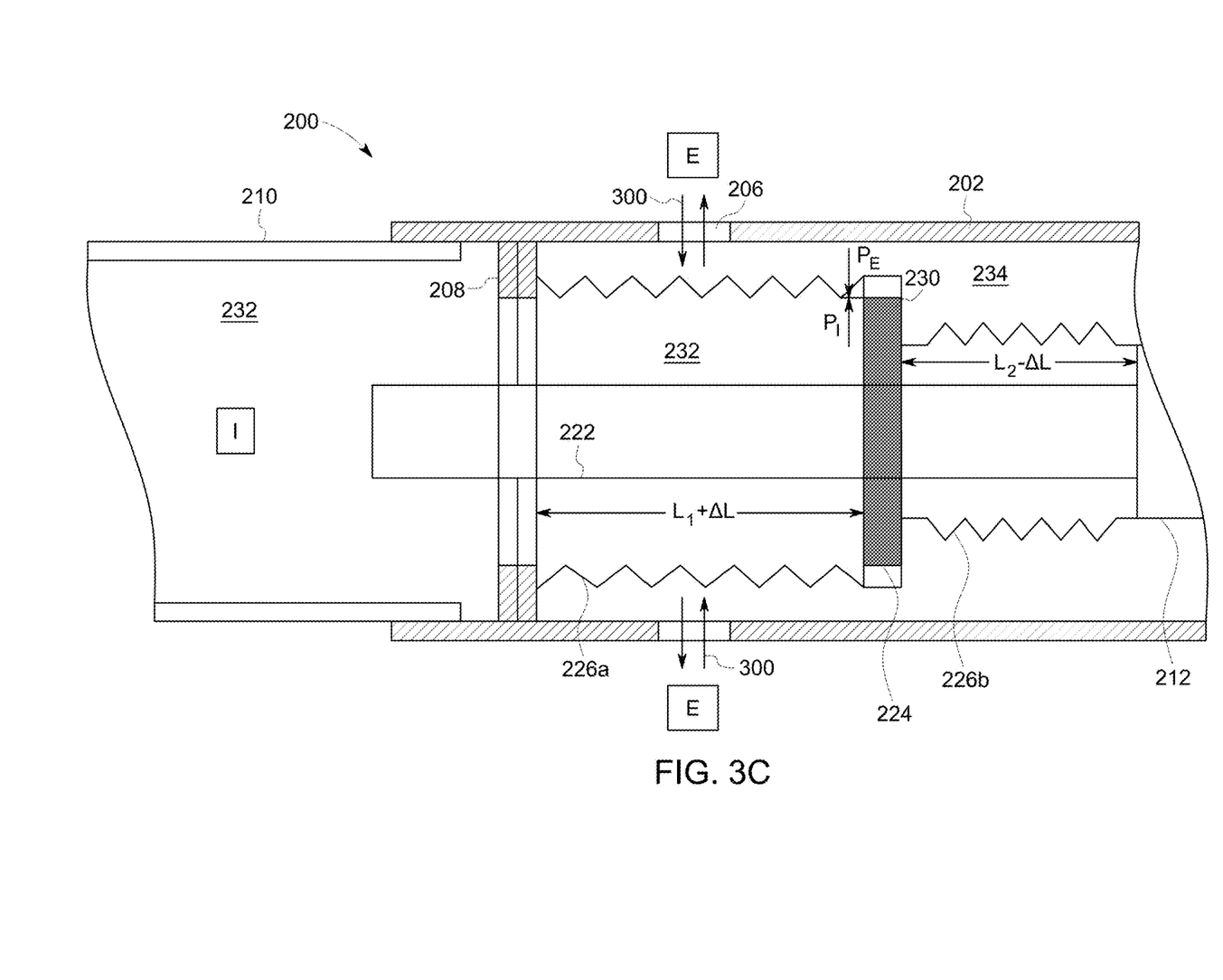
FIG. 3C is an enlarged side view illustrating the chambered seals of FIG. 2 in a second deflected position.

FIGS. 3A-3C present enlarged side cross-sectional views of the proximity sensor 200, illustrating use of the chambered seal 224 to equalize pressure within the sealed cavity 232. As shown in FIG. 3A, fluids contained within the fluid environment E can surround the proximity sensor 200 and flow freely into or out of the open cavity 234 through the aperture(s) 206, as indicated by arrows 300. As a result, the fluid environment E can exert an external pressure $P_E$ radially on the chambered seal 224. As also shown in FIG. 3A, the incompressible fluid I and the proximity sensing elements 204 can be present within the sealed cavity 232. Accordingly, the incompressible fluid I can apply an internal pressure $P_I$ to the chambered seal 224 that radially opposes the external pressure $P_E$.

When there is a difference between a magnitude of the internal pressure $P_I$ and the magnitude of the external pressure $P_E$, the chambered seal 224 can be configured to undergo movement in order to equalize the internal pressure $P_I$ with the external pressure $P_E$. In general, this movement can take the form of elastic deformation from a first position to a second position, such as translation in an axial direction towards one of the distal end $202d$ or the proximal end $202p$ of the housing 202.

As an example, when the internal pressure $P_I$ and the external pressure $P_E$ are equal, there is no net pressure upon the chambered seal 224 and the chambered seal 224 can remain stationary, with the first chamber 226a having a length $L_1$ and the second chamber 226b having a length $L_2$, as shown in FIG. 3A. As shown in FIG. 3B, when the external pressure $P_E$ becomes greater than the internal pressure $P_I$, the chambered seal 224 can move from the first position to the second position by a distal translation of the collar 230 (e.g., by an amount $\Delta L$). This distal translation can axially compress the first chamber 226a, decreasing its length by $-\Delta L$, from length $L_1$ to $L_1-\Delta L$, and decreasing its volume. Concurrently, the second chamber 226b can axially expand and increase its length by $+\Delta L$, from length $L_2$ to $L_2+\Delta L$, increasing its volume. This circumstance can arise when the proximity sensor 200 is taken from a location having a relatively low external pressure $P_E$ (e.g., a surface location) and positioned in a location having a relatively high external pressure $P_E$ (e.g., a subsea location where the external pressure $P_E$ increases significantly due to the weight of water above the subsea location). Because the first chamber 226a has a larger diameter than the second chamber 226b, the decrease in volume of the first chamber 226a is greater than the increase in volume of the second chamber 226b, resulting in a net decrease in the volume of the chambered seal 224. Owing to the incompressibility of the incompressible fluid I, this decrease in the volume of the chambered seal 224 can also decrease the volume of the sealed cavity 232 and increase the internal pressure $P_I$. The movement of the collar 230 can continue until the internal pressure $P_I$ equals the external pressure $P_E$.

In contrast, when the external pressure $P_E$ is less than the internal pressure $P_I$, the chambered seal 224 can move from the first position to the second position by a proximal translation of the collar 230 (e.g., by an amount $\Delta L$). This proximal translation can axially expand the first chamber 226a and increase its length by $+\Delta L$, from length $L_1$ to $L_1+\Delta L$, increasing its volume. Concurrently, the second chamber 226b can axially compress and decrease its length by $-\Delta L$, from length $L_2$ to $L_2-\Delta L$, decreasing its volume. This circumstance can arise when the proximity sensor 200 is taken from a location having a relatively high external pressure $P_E$ (e.g., a subsea location) and positioned in a location having a relatively low external pressure $P_E$ (e.g., a surface location). Because the first chamber 226a has a larger diameter than the second chamber 226b, the increase in volume of the first chamber 226a is greater than the decrease in volume of the second chamber 226b, resulting in a net increase in the volume of the chambered seal 224. Owing to the incompressibility of the incompressible fluid I, this increase in the volume of the chambered seal 224 can also increase the volume of the sealed cavity 232 and decrease the internal pressure $P_I$. The movement of the collar 230 can continue until the internal pressure $P_I$ equals the external pressure $P_E$.

In certain embodiments, the internal pressure $P_I$ prior to deployment of the proximity sensor 200 (e.g., when the sealed cavity 232 is sealed from the fluid environment E) can be approximately equal to atmospheric pressure. In other embodiments, the internal pressure $P_I$ prior to deployment of the proximity sensor 200 can be greater than atmospheric pressure.

Figure 4:
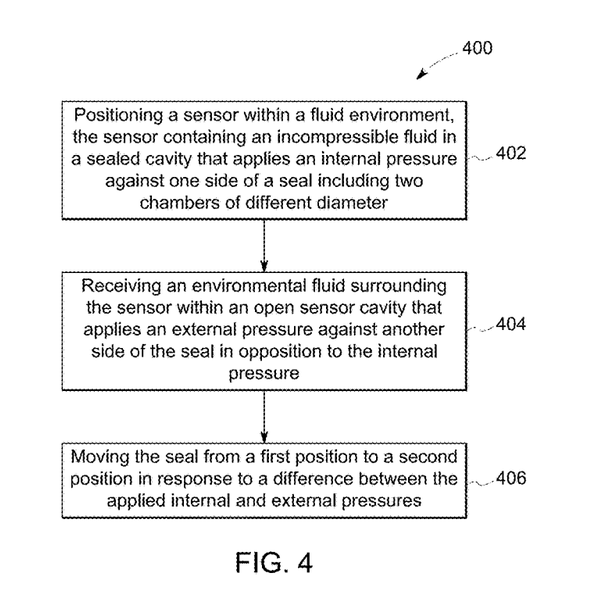
FIG. 4 is a flow diagram illustrating an exemplary embodiment of a method for equalizing pressure of a sensor with a fluid environment.

FIG. 4 is a flow diagram illustrating an exemplary embodiment of a method 400 for equalizing pressure within a sensor including operations 402-406. The method 400 is described below in connection with the pressure compensated sensing system 102 of FIG. 1. However, the method 400 is not limited to use with the pressure compensated sensing system 102 and can be used with any sensing system. In certain aspects, embodiments of the method 400 can include greater or fewer operations than illustrated in FIG. 4 and can be performed in a different order than illustrated in FIG. 4.

As shown in FIG. 4, in operation 402, the sensor (e.g., sensing system 102 of FIG. 1) can be positioned within the fluid environment E. As discussed above, the sensing system 102 can include the sealed cavity 114 having two or more chambers 110a, 110b axially coupled together and the incompressible fluid I and at least one sensing element 112. The incompressible fluid I can apply the internal pressure $P_I$ against one side of the seal 110 (e.g., facing outward from the longitudinal axis A). In one aspect, the incompressible fluid I can substantially fill all void space within the sealed cavity 114. In another aspect, the sealed cavity 114 can be substantially free of compressible materials.

In operation 404, an environmental fluid E surrounding the sensing system 102 can fill the open cavity 116 and exert the environmental pressure $P_E$ against another side of the seal 110 opposite the internal pressure $P_I$ (e.g., a side of the seal 110 facing inward towards the longitudinal axis A). In certain aspects, the seal 110 can be in the form of two or more bellows (e.g., the first chamber 226a the second chamber 226b of FIG. 2) coupled together by the collar 230.

In operation 406, the seal 110 can move in response to a pressure difference between the internal pressure $P_I$ applied to the seal 110 by the incompressible fluid I and the external pressure $P_E$ applied to the seal 110 by the environmental fluid E. As discussed above, movement of the seal 110 from a first position to a second position can be an axial translation of the collar 230 to change the relative volume of the first and second chambers 226a, 226b, thereby increasing or decreasing the volume of the sealed cavity 232.

Exemplary technical effects of the methods, systems, and devices described herein include, by way of non-limiting example, pressure compensation of sensors deployed in subsea environments.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A pressure compensated sensor system, comprising:
  a housing extending along a length between a proximal end and a distal end and defining a cavity therein;
  a seal positioned within the cavity and dividing the cavity into a first fluidly sealed cavity portion and a second cavity portion that is in fluid communication with a fluid environment surrounding the housing;
  one or more sensing elements positioned within the first cavity portion; and
  an incompressible fluid disposed within the first cavity portion;
  wherein the seal comprises at least two chambers, each chamber having a volume that is configured to change in response to a pressure differences between the first cavity portion and the second cavity portion;
  wherein the second cavity portion is bounded by an outer surface of the seal, the housing, an inward extending wall coupled to the housing adjacent the distal end of the housing, and an electrical connector coupled to the proximal end of the housing, wherein the inward extending wall and the electrical connector inhibit flow of fluid between the second cavity portion and the fluid environment.

2. The system of claim 1, wherein the housing includes at least one aperture extending through an external surface of the housing at a position along the length of the housing, the aperture being configured to allow fluid to flow from the fluid environment into the second cavity portion.

3. The system of claim 1, wherein the seal includes a collar interposed between a first chamber and a second chamber, wherein opposing ends of the first and second chambers are coupled to the collar.

4. The system of claim 3, wherein the collar is configured to axially translate along a longitudinal axis of the housing to change the volume in each of the first and second chambers.

5. The system of claim 1, wherein the incompressible fluid substantially fills the first cavity portion, and the one or more sensing elements are submerged in the incompressible fluid.

6. The system of claim 1, wherein the incompressible fluid comprises a dielectric.

7. The system of claim 1, further comprising a cap coupled to the distal end of the housing and defining a cap volume configured to receive the one or more sensing elements.

8. The system of claim 1, wherein the one or more sensing elements are proximity sensing elements.

* * * * *